United States Patent [19]
Schramm et al.

[11] Patent Number: 5,844,955
[45] Date of Patent: Dec. 1, 1998

[54] APPARATUS AND METHOD FOR INSPECTING AN OUTER JACKET OF A CORE CONTAINMENT IN THE REGION OF A HEAT SHIELD SURROUNDING THE CORE CONTAINMENT

[75] Inventors: Herbert Schramm, Höchstadt; Roland Gottfried, Langensendelbach; Erich Haas, Rückersdorf, all of Germany

[73] Assignee: Siemens Aktiengesellschaft, Munich, Germany

[21] Appl. No.: 866,475

[22] Filed: May 30, 1997

Related U.S. Application Data

[63] Continuation-in-part of PCT/DE95/01666, Nov. 27, 1995, published as WO96/17357, Jun. 6, 1996.

[30] Foreign Application Priority Data

Nov. 30, 1994 [DE] Germany .......................... 44 42 620.8

[51] Int. Cl.[6] .............................................. G21C 17/007
[52] U.S. Cl. ........................................... 376/249; 376/248
[58] Field of Search .................................... 376/245, 248, 376/249, 252, 287, 291, 292; 73/622, 623

[56] References Cited

U.S. PATENT DOCUMENTS

| | | | |
|---|---|---|---|
| 4,844,858 | 7/1989 | Fero et al. | 376/254 |
| 5,128,094 | 7/1992 | Müller et al. | 376/249 |

FOREIGN PATENT DOCUMENTS

| | | |
|---|---|---|
| 0418708A2 | 3/1991 | European Pat. Off. . |
| 3524390A1 | 1/1987 | Germany . |
| 9011617.8 | 12/1990 | Germany . |
| 4014161A1 | 11/1991 | Germany . |
| 8519751.3 | 3/1993 | Germany . |

OTHER PUBLICATIONS

"Innovationen–Innovations", Atomenergie—Kerntechnik, vol. 34, 1979, p. 231.
Japanese Patent Abstract No. 51722986 (Shoichi et al.), dated Jul. 13, 1993.
Japenese Patent Abstract No. 6117762 (Hirotsugo), dated Apr. 28, 1994.
Japanese Patent Abstract No. 59075192, dated Apr. 27, 1984.

*Primary Examiner*—Daniel D. Wasil
*Attorney, Agent, or Firm*—Herbert L. Lerner; Laurence A. Greenberg

[57] ABSTRACT

An apparatus and a method for inspecting an outer jacket of a core containment in the region of a heat shield surrounding the core containment, include a plate mounted rotatably on a bottom of a storage basin. The core containment is deposited on the bottom. A mast is deposited on the bottom next to the core containment. A vertical carriage is disposed on the mast for movement in the longitudinal direction of the mast. An outrigger which is disposed on the vertical carriage can be introduced into a region between the outer jacket of the core containment and a heat shield and has a free end which carries an inspection device.

7 Claims, 3 Drawing Sheets

APPARATUS AND METHOD FOR INSPECTING AN OUTER JACKET OF A CORE CONTAINMENT IN THE REGION OF A HEAT SHIELD SURROUNDING THE CORE CONTAINMENT

CROSS-REFERENCE TO RELATED APPLICATION

This application is a Continuation of International application Ser. No. PCT/DE95/01666, filed Nov. 27, 1995, published as WO96/17357, Jun. 6, 1996.

BACKGROUND OF THE INVENTION

Field of the Invention

The invention relates to an apparatus and a method for inspecting an outer jacket of a core containment in the region of a heat shield surrounding the core containment.

In order to check the safety of nuclear power plants, it is necessary for safety-relevant plant parts, which undergo high stress during their regular operation, to be subjected at regular intervals to checking and inspection. That also includes core containment screws or core baffle bolts which are disposed on the outer jacket of the core containment receiving the core fittings. However, in many plants, it is difficult to gain access to those core containment screws, since the core containment is closely surrounded by a heat shield there. Only a small gap which, for example, may amount to between 16 and 50 mm and which makes testing from outside more difficult, remains between the heat shield and the outer jacket of the core containment.

SUMMARY OF THE INVENTION

It is accordingly an object of the invention to provide an apparatus and a method for inspecting an outer jacket of a core containment in the region of a heat shield surrounding the core containment, which overcome the hereinafore-mentioned disadvantages of the heretofore-known apparatuses and methods of this general type and which allow inspection in the region of a confined space between the core containment and the heat shield surrounding the core containment.

With the foregoing and other objects in view there is provided, in accordance with the invention, an apparatus for inspecting an outer jacket of a core containment in the vicinity of a heat shield surrounding the core containment and defining a region between the core containment and the heat shield, the apparatus comprising a plate for receiving the core containment, the plate mounted for rotation about an axis of rotation on a bottom of a storage basin; a mast disposed on the bottom and having a longitudinal direction extending parallel to the axis of rotation of the plate; a vertical carriage mounted on the mast for movement in the longitudinal direction of the mast; an outrigger disposed on the vertical carriage for introducing the outrigger into the region between the outer jacket of the core containment and the heat shield, the outrigger having a free end; and an inspection device carried on the free end of the outrigger.

In accordance with another feature of the invention, the outrigger is disposed on the vertical carriage in such a way as to be displaceable transversely relative to the longitudinal axis of the mast.

In accordance with a further feature of the invention, the outrigger is a chain.

In accordance with an added feature of the invention, the free end of the outrigger receives an inspection device carrier movable in the longitudinal direction of the outrigger.

In accordance with an additional feature of the invention, there is provided a video camera disposed on the inspection device carrier.

In accordance with yet another feature of the invention, there is provided a test head for nondestructive material testing being disposed on the inspection device carrier so as to be displaceable transversely relative to the longitudinal axis of the outrigger.

With the objects of the invention in view there is also provided a method for inspecting an outer jacket of a core containment in the vicinity of a heat shield surrounding the core containment, which comprises mounting a plate on a bottom of a storage basin for rotation of the plate about an axis of rotation; depositing a core containment with an outer jacket onto the plate; depositing a mast having a longitudinal direction on the bottom next to the core containment with the longitudinal direction of the mast extending parallel to the axis of rotation of the plate; placing a vertical carriage on the mast for movement in longitudinal direction of the mast; placing an outrigger with a free end, on the vertical carriage; carrying an inspection device at the free end of the outrigger; and introducing the outrigger into a region between the outer jacket of the core containment and a heat shield surrounding the core containment.

Other features which are considered as characteristic for the invention are set forth in the appended claims.

Although the invention is illustrated and described herein as embodied in an apparatus and a method for inspecting an outer jacket of a core containment in the region of a heat shield surrounding the core containment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
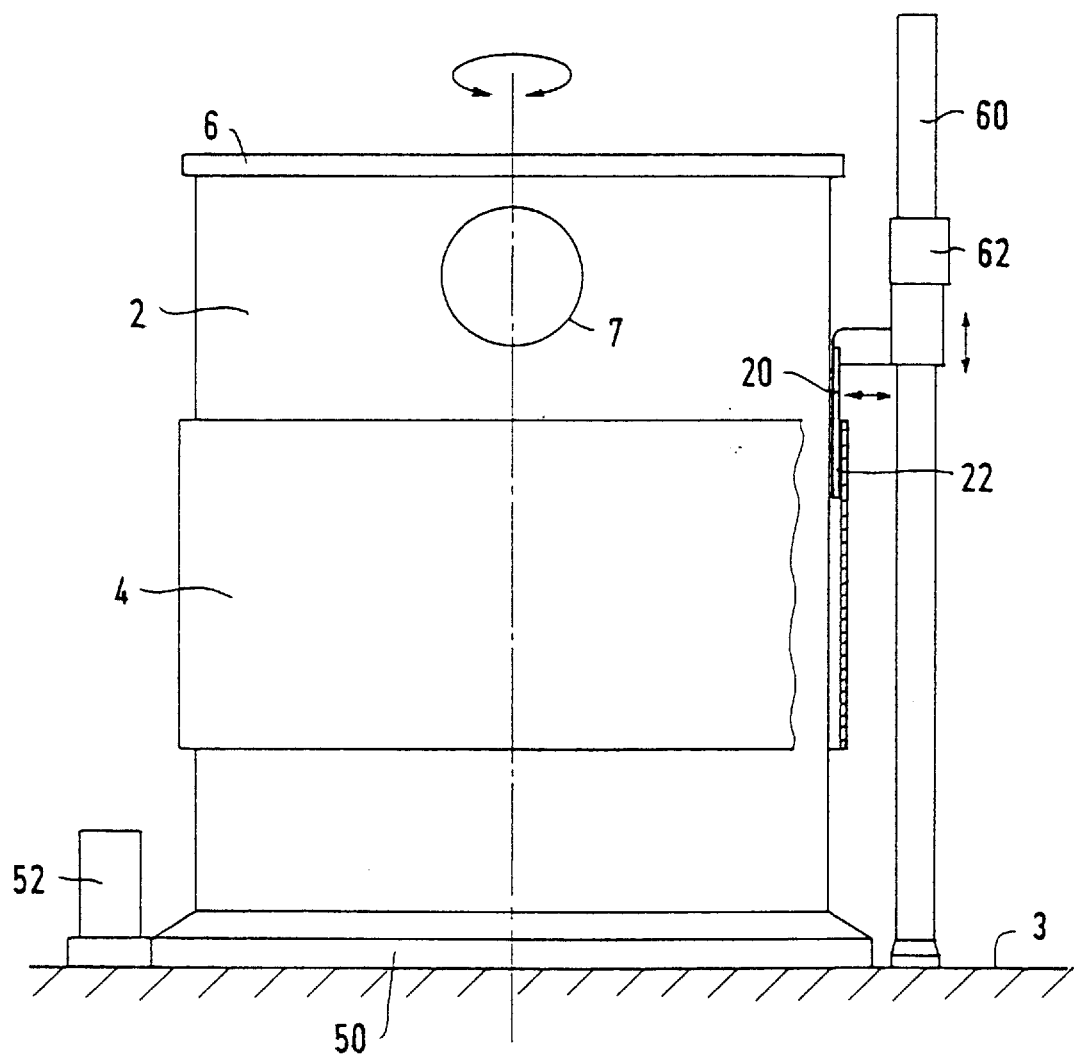
FIG. 1 is a fragmentary, diagrammatic, elevational view of an apparatus according to the invention disposed next to a core containment.

Referring now to the figures of the drawings in detail and first, particularly, to FIG. 1 thereof, there is seen a core containment 2 which is deposited onto a plate 50 located on a bottom 3 of a storage basin. A partial region of an outer jacket of the core containment 2 is surrounded by a heat shield 4. A narrow gap or region 5 which may amount to between 16 mm and 50 mm depending on the actual embodiment, is disposed between the core containment 2 and the heat shield 4.

The plate 50 is mounted rotatably on the bottom 3 and is coupled to a rotary drive 52, so that the entire core containment 2 can be rotated about its center axis.

A mast 60 is deposited in a stationary manner on the bottom 3 next to the core containment 2 and carries a vertical carriage or slide 62 that is movable in the direction of its longitudinal axis.

An outrigger or boom 20 which is disposed on the vertical carriage 62 has a free end that can be introduced into the space or gap 5 located between the heat shield 4 and core containment 2. The outrigger 20 is mounted in the vertical carriage 62 in such a way as to be movable parallel to its longitudinal axis, in order to allow the outrigger 20 to be introduced into the gap 5 even under confined space conditions. In a preferred embodiment, the outrigger 20 is a telescopic outrigger or arm which can be extended parallel to the longitudinal axis of the mast 60 and through the use of which even deeper test positions in the gap 5 can be reached. Moreover, the outrigger 20 is mounted on the vertical carriage 62 in such a way as to be displaceable, that is to say radially advanceable, transversely relative to the longitudinal axis of the mast 60 and perpendicularly relative to the circumferential direction of the core containment 2, in order to allow accurate positioning in the gap 5. This radial advancing movement of the outrigger 20 is necessary on one hand in order to pass obstacles during the movement of the vertical carriage 62 and on the other hand in order to be capable of being positioned above the gap 5 after these obstacles have been circumvented. Such obstacles are formed, for example, by a flange disposed at an upper edge 6 and projecting beyond the jacket or casing of the core containment 2, or by an outlet connection piece or neck 7 projecting beyond an outer surface of the core containment 2.

An inspection device carrier 22 for an inspection device that is necessary for inspection, for example a video camera and/or an ultrasonic test head, is disposed on the free end of the outrigger 20.

Figure 2:
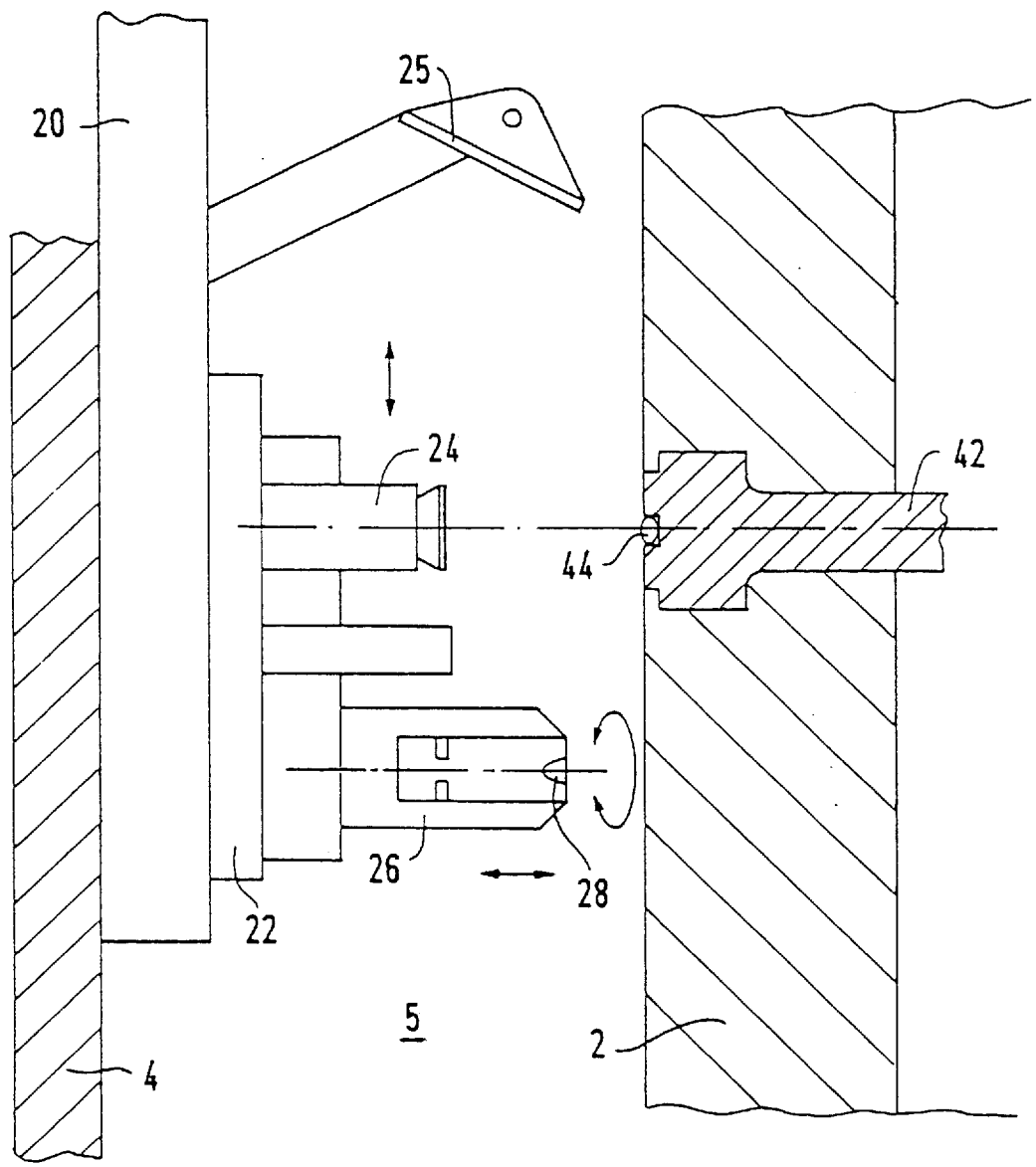
FIG. 2 is an enlarged, fragmentary, sectional view of an outrigger of the apparatus according to the invention, which projects into a space between the heat shield and the core containment.

According to FIG. 2, the free end of the outrigger 20 is introduced into the annular gap 5 between the heat shield 4 and the core containment 2. The free end of the outrigger 20 has a slide guide which is disposed parallel to the longitudinal direction of the outrigger and on which an inspection device carrier 22 constructed as a slide is mounted for sliding, so that the inspection device carrier 22 can be displaced vertically. In the example shown in FIG. 2, the inspection device carrier 22 contains a video camera 24 and a test head 26 for nondestructive material testing, for example an ultrasonic test head. The test head 26 is mounted on the inspection device carrier 22 in such a way as to be rotatable about an axis of rotation oriented perpendicularly to the longitudinal direction of the outrigger 20 and perpendicularly to the circumferential direction of the core containment 2. Moreover, the test head 26 is disposed on the inspection device carrier 22 in such a way as to be displaceable in the direction of the axis of rotation.

Through the use of the video camera 24, the inspection device carrier 22 can be aligned exactly with a screw 42 to be tested in the core containment 2. For this purpose, the screw 42 is moved precisely into a predetermined image position on a surveillance monitor. Due to the fixed distance between the video camera 24 and the test head 26, the latter can thereupon be moved exactly into a position above the screw 42 and be placed precisely onto the head of the screw 42 which is provided with a retaining pin 44 in the illustrated example.

The test head 26 has a surface shape that is adapted to the head shape of the screw 42. The rotatability of the test head 26 is necessary, in this case, in order to align the test head 26 correctly with the orientation of the screw head. In the exemplary embodiment, the screw 42 is a slotted screw having the retaining pin 44, with which a groove 28 located in the coupling surface of the test head 26 has to be aligned.

Figure 3:
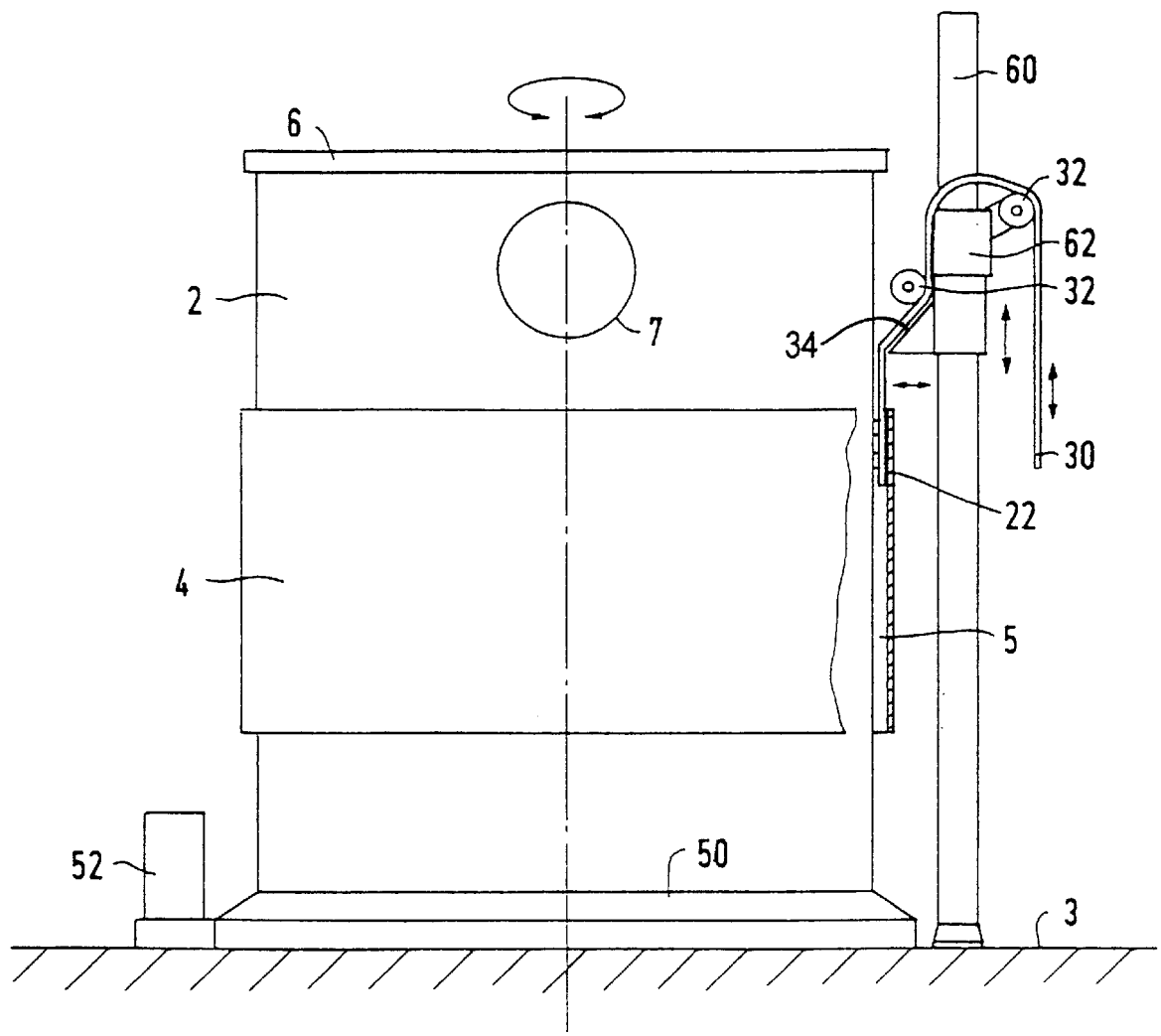
FIG. 3 is a fragmentary, elevational view of a further advantageous embodiment of the invention, in which a chain is provided as an outrigger.

FIG. 3 illustrates a further advantageous embodiment of the invention, in which a chain 30, which is guided by guide rollers 32 disposed on the vertical carriage or slide 62, is provided as an outrigger. A chain guide 34 which is provided on the vertical carriage 62 in order to guide the chain 30 for precise positioning, can be displaced transversely relative to the longitudinal direction of the mast 16. In an advantageous embodiment, a slide guide for an inspection device carrier, such as is illustrated in more detail in FIG. 2, is likewise disposed at the end of the chain 30.

In some cases, the core containment 2 is surrounded by a heat shield that is formed of a plurality of ring segments which are spatially separated from one another so that the gap between the heat shield and the core containment can also be reached from the side. In such cases, the outrigger which may be disposed on the vertical carriage can be a telescopic outrigger that extends transversely relative to the longitudinal axis of the mast, is curved according to the curvature of the wall of the core containment and is mounted on the vertical carriage in such a way as to be displaceable in the circumferential direction.

We claim:

1. In an assembly having a core containment with an outer jacket, a heat shield surrounding the core containment and defining a region between the core containment and the heat shield, and a storage basin having a bottom, an apparatus for inspecting the outer jacket in the vicinity of the heat shield, the apparatus comprising:
   a) a plate for receiving the core containment, said plate mounted for rotation about an axis of rotation on the bottom of the storage basin;
   b) a mast disposed on the bottom and having a longitudinal direction extending parallel to the axis of rotation of said plate;
   c) a vertical carriage mounted on said mast for movement in the longitudinal direction of said mast;
   d) an outrigger disposed on said vertical carriage for introducing said outrigger into the region between the outer jacket of the core containment and the heat shield, said outrigger having a free end; and
   e) an inspection device carried on said free end of said outrigger.

2. The apparatus according to claim 1, wherein said outrigger is transversely displaceable on said vertical carriage relative to the longitudinal axis of said mast.

3. The apparatus according to claim 1, wherein said outrigger is a chain.

4. The apparatus according to claim 1, including an inspection device carrier disposed at said free end of said outrigger, movable in longitudinal direction of said outrigger and carrying said inspection device.

5. The apparatus according to claim 4, wherein said inspection device includes a video camera disposed on said inspection device carrier.

6. The apparatus according to claim 4, wherein said inspection device includes a test head for nondestructive material testing, said test head disposed on said inspection device carrier for transverse displacement relative to the longitudinal axis of said outrigger.

7. A method for inspecting an outer jacket of a core containment in the vicinity of a heat shield surrounding the core containment, which comprises:

a) mounting a plate on a bottom of a storage basin for rotation of the plate about an axis of rotation;

b) depositing a core containment with an outer jacket onto the plate;

c) depositing a mast having a longitudinal direction on the bottom next to the core containment with the longitudinal direction of the mast extending parallel to the axis of rotation of the plate;

d) placing a vertical carriage on the mast for movement in longitudinal direction of the mast;

e) placing an outrigger with a free end, on the vertical carriage;

f) carrying an inspection device at the free end of the outrigger; and g) introducing the outrigger into a region between the outer jacket of the core containment and a heat shield surrounding the core containment.

* * * * *